May 25, 1965     H. F. FRUTH ETAL     3,184,888
LIQUID APPLICATOR DEVICE
Filed May 21, 1963
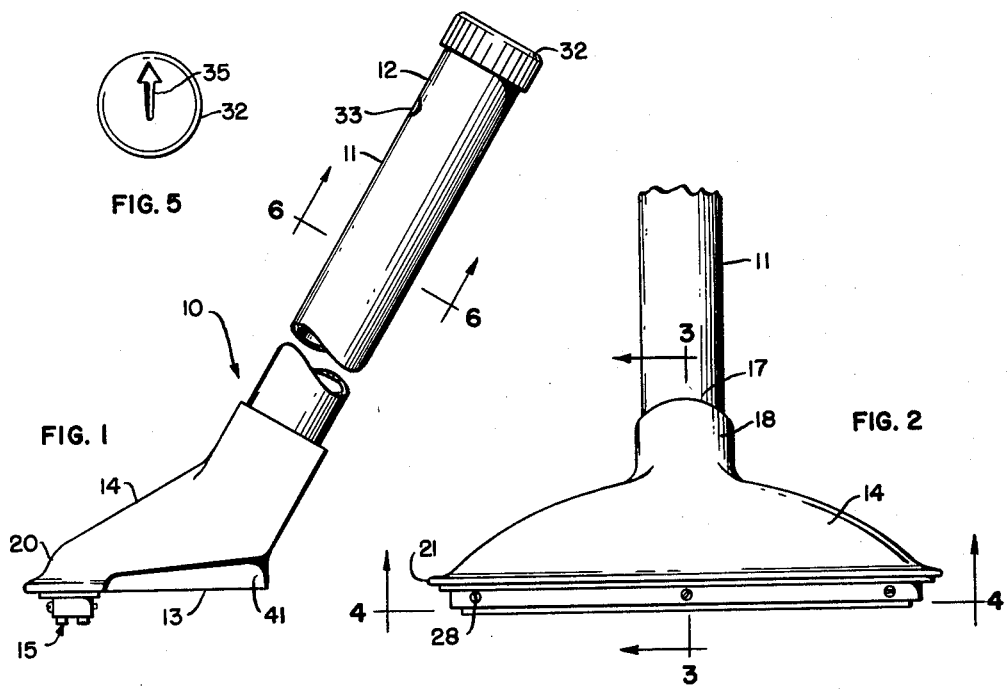
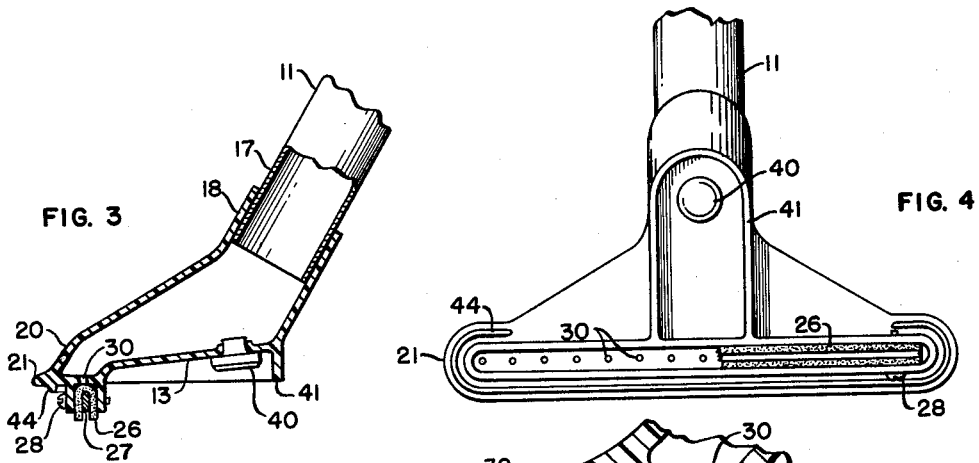
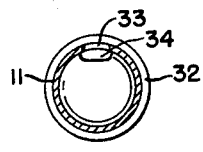
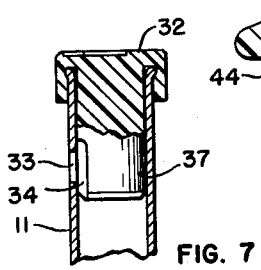
INVENTORS
HAL F. FRUTH
CARL J. MITCHELL
BY
ATTORNEY United States Patent Office 3,184,888
Patented May 25, 1965

3,184,888
LIQUID APPLICATOR DEVICE
Hal F. Fruth, 5032 Morse Ave., Skokie, Ill., and Carl J. Mitchell, R.F.D. 3, Woodstock, Ill.
Filed May 21, 1963, Ser. No. 282,100
6 Claims. (Cl. 47—1.5)

This invention relates to a liquid dispensing device and more particularly to a manually operable device for dispensing a liquid weed-killing solution.

In many applications it is desired to dispense a liquid weed-killing solution over a relatively wide area such as the area between rows of crops that are themselves susceptible to the weed-killing solution being dispensed. This is particularly true where the weed-killing solution is designed to kill broad-leaf weed plants and grasses and the rows of plants to be weeded are also broad-leaf plants. Spraying, of course, is not suitable since a mist or airborne droplets of the weed killer will come into contact with the broad-leaf plants in the rows. Accordingly, an object of the present invention is to provide a suitable dispenser for a liquid weed-killing solution particularly adapted to be used between rows of plants.

Another object of the invention is to dispense a liquid weed-killing solution by rubbing a saturated applicator on a weed or on a lawn having weeds therein.

A further object of the invention is to provide a dispenser for a weed-killing solution having a guard thereon to prevent the plants in the rows from engaging the liquid applicator portion of the dispenser.

A further object of the invention is to assure the plants in the rows do not receive any weed-killing solution by providing the liquid dispenser with an effective liquid barrier element between the guard portion and the liquid applying portion of the device.

According to the preferred embodiment of the invention, the liquid dispensing device has a hollow handle and a hollow expanded shoe at the end of the handle filled with a liquid weed-killing solution. The underside of the shoe carries a porous liquid applicator saturated by a liquid fed thereto from a reservoir of liquid in the handle and shoe of the device. A suitable valve is manipulated to regulate the flow of the liquid to the applicator. On the underside of the shoe and surrounding the brush-type applicator is a barrier element or bead which prevents the liquid from flowing across the bottom of the shoe where the liquid might contact plants such as those in rows. On the upper side of the shoe and extending outwardly of the shoe is a guard element or flange which serves to push aside those portions of the plants extending into the area between the rows when the dispenser is being used between rows of plants.

These and other objects of the invention will become more readily apparent after reference to the following detailed description when considered in conjunction with the accompanying drawings wherein:

FIG. 1 is a side perspective view of the liquid dispenser according to the present invention;

FIG. 2 is a front perspective view of the shoe of the liquid dispenser according to the invention;

FIG. 3 is a sectional view taken along the lines 3—3 in FIG. 2 in the direction of the arrows and showing the shoe and applicator attached to the underside of the shoe;

FIG. 4 is a bottom view taken in the direction of the arrows and along the line 4—4 of FIG. 2 showing the bottom of the shoe;

FIG. 5 is a perspective view of the top of a cap on the handle showing an arrow on the cap;

FIG. 6 is a sectional view taken in the direction of the arrows along the lines 6—6 in FIG. 2 showing a valve groove in the cap aligned with a hole in the wall of the handle;

FIG. 7 is an enlarged sectional view showing the valve arrangement constituted by the cap and an aperture in the wall of the handle, and FIG. 8 is an enlarged sectional view showing the manner of securing the liquid carrying applicator to the underside of the shoe according to the present invention.

Referring now to the drawings and more particularly to FIG. 1, the liquid dispensing device 10 is shown in position in which it would be held by a person moving the device 10 forwardly over the area containing weeds. That is, the operator grasps the handle 11 near its upper end 12 and holds the bottom portion 13 of a shoe member 14 parallel to surface receiving the weed killer from the applicator 15 on the bottom of the shoe member 14.

As best seen in FIG. 3, the handle 11 is a hollow tube preferably of plastic material and has a lower end portion 17 secured within a hollow cylindrical portion 18 of the hollow shoe member 14, which is of molded plastic material. The shoe member 14 flares laterally outward from its upper cylindrical portion 18 to a front portion 20 (FIG. 2), the width of the front portion 20 being approximately that of the dimension customarily between rows of plants. A guard or bumper 21 is integrally formed on the front portion 20 of the shoe member 14 and extends outwardly thereof about the peripheral surface of the shoe 14 for engaging those portions of the plants extending into the area between rows. That is, as the operator moves the dispenser 10 across the surface between rows of plants the bumper 21 engages those portions of the plants extending into this area and pushes them away from the shoe 14 and forces them back into the rows and out of the path of the applicator 15.

For receiving the applicator 15, the bottom portion 13 of the shoe member 14, at the front portion thereof, has a dependent and elongated ring member 24 with a central cavity 25. As best shown in FIG. 8, the applicator 15 is constituted by a downwardly turned U-shaped porous member 26 bent about a stiffener or spacing bar 27. The applicator 15 is held within the cavity by a plurality of spaced self tapping screw members 28 extending through apertures in the walls of the elongated ring member 24, the porous member 26 and the stiffener bar 27. Thus, the porous members 26 is firmly secured within the cavity 25 with the lower portions of the legs of the porous member 15 extending downwardly of the elongated ring member 15 for contact with the weeds. Thus, when the porous member 26 is rubbed across a lawn or over weeds between rows of plants, the porous member 26 can be pressed firmly against the grass or weeds to assure that the weeds are wiped with a sufficient application of fluid. Also, weeds that do not extend completely upward to the plane of lawn surface or weed surface can be reached by pressing the grass or weeds downwardly when rubbing the applicator 15 across this upper surface. Manifestly, the operator could selectively touch those weeds that he recognizes, to apply the weed killed thereto, rather than applying over an entire area of a lawn or the like.

The applicator 15 is supplied with the weed-killing fluid through a series of spaced apertures 30 in the bottom portion 13 of the shoe member 14 leading to the cavity 25 wherein the porous member 26 absorbs the fluid and conveys it downwardly to its lower portion extending outwardly of the elongated ring member 24. The rate at which the fluid is being dispensed by the applicator 15 is observed by the operator and the operator turns an end cap 32 on the upper end 12 of the handle 11 to adjust the amount of opening for passage of air through an aperture 33 in the wall of handle 11 and an elongated groove 34 (FIG. 7) in the end cap 32. Thus, the groove 34 cooperates with the aperture 33 to act as a bleed-type valve to supply air pressure to top surface of the fluid within the hollow handle 11. When the end cap 32 is turned so that an embossed arrow 35 (FIG. 5) on its top surface is out of alignment with the aperture 33, the nongrooved portion 37 of the end cap 32 will seal the aperture 33 to prevent outside air from reaching the top surface of the fluid. Thus, as fluid leaves the shoe 14 and handle 11, a partial vacuum will be formed within the hollow handle to reduce the flow of fluid through apertures 30. Conversely, the further there is a matching of the aperture 33 and the elongated groove 34, the faster the fluid will flow through the apertures 30 to the porous member 26.

Preferably, the porous member 26 is kept saturated with fluid during use and is of a type of material capable of absorbing large quantities of fluid and capable of readily releasing the fluid when pressed against a weed. In practice, natural sponges or plastic foams such as polyurethane foam have been found to be excellent materials. Of course, a brush or bristle type of applicator could be employed as could other types of valves, such as needle valves, without departing from the scope of the invention.

The hollow shoe member 14 and handle 11 can be filled either by removing the end cap 32 or by removing a stopper 40 inserted in an aperture in the bottom wall 13 of the shoe 13 and pouring the liquid through one of these openings.

To assure the dispensing device is maintained at an advantageous or more effective angle, the shoe member 14 has a dependent skid or heel 41 for sliding engagement with the lawn or surface area between rows of plants. As best seen in FIG. 14, the heel 41 extends longitudinally rearward and encircles the stopper 40 to prevent its being inadvertently pulled out of its matching aperture due to snagging of a weed or some similar event.

As best seen in FIGS. 3, 4 and 8 an integrally formed bead 44 is formed on the bottom surface 13 of the shoe member 14 and is forwardly of the elongated ring member 24 containing the applicator 15 and encircles the outer end portions 45 of the ring member 24. The bead 44 serves as a liquid barrier element for preventing liquid from flowing across the underside or bottom surface 13 of the shoe member 14 to the outer edges thereof or onto the guard 21 whereat the fluid could contact plants which should not receive the fluid. If any fluid does begin to move across the bottom surface 13 from the applicator 15 the fluid will form on the bottom of the bead 44 and be wiped therefrom before it reaches the outer peripheral edge of the shoe member 14. Thus, the bead 44 also serves as a barrier to the flow of fluid to the guard or bumper 21.

From the foregoing, it should be apparent that the present weed applicator is capable of use between rows of plants or in areas of flower gardens where prior art devices could not be employed to such advantage.

Although only one embodiment of the invention is shown in the drawings and described in the foregoing specification, it will be understood that the invention is not limited to the specific embodiment described, but is capable of modification and rearrangement and substitution of parts and elements without departing from the spirit of the invention.

What is claimed is:
1. A fluid weed-killing applicator device adapted to be used between rows of plants susceptible to the weed-killing fluid being applied, comprising
    (a) a hollow handle means,
    (b) a hollow reservoir means secured to handle means and in fluid communication therewith, said reservoir means extending transversely of said handle means, said reservoir means extending normal to said handle means and being adapted to move between spaced rows of plants,
    (c) an elongated receiving means on the underside of said reservoir means having a cavity therein into which is fed the weed-killing liquid,
    (d) an applicator means secured within the cavity in said receiving means receiving said weed-killing fluid, the lower portion of said applicator means extending downwardly of said receiving means and said reservoir means for engagement with the weeds, said applicator means being elongated and transversely extending relatively to said handle means, and adapted to engage the area of weeds between a pair of rows of plants,
    (e) a bumper means on the outer surface of said reservoir means to engage the plants extending from the rows into the area therebetween, and
    (f) a barrier means at least partially encircling said applicator means to prevent fluid from flowing across the underside of said reservoir means to said bumper means.

2. The applicator device of claim 1, wherein the applicator means includes a porous member for absorbing the weed-killing fluid and dispensing the weed-killing fluid when placed in contact with plants.

3. The applicator device of claim 2 wherein is provided an adjustable valve means for controlling the rate of flow of fluid from the reservoir means to the porous member.

4. A fluid applicator device for applying a weed-killing solution to weeds between rows of plants comprising:
    (a) a hollow handle means for receiving weed-killing solution,
    (b) a shoe-like member secured to said handle means, and in fluid communication therewith, said shoe-like member flaring outwardly from said handle means to a portion extending at right angles to said handle means, said shoe member being hollow and adapted to be filled with weed-killing solution,
    (c) an applicator means secured to said portion of said shoe-like member and extending at right angles to said handle means and across said shoe-like member, said applicator means being in fluid communication with said shoe-like member to receive weed-killing solution and adapted to apply weed-killing solution between the rows of plants,
    (d) a skid portion on the under surface of said shoe-like member adapted to be skidded along the surface between the row of plants as weed-killing solution is being applied by said applicator means,
    (e) a bumper means on the outer surface of said reservoir means to brush aside plants from said applicator means, and
    (f) an adjustable valve means on said handle means for controlling the rate of flow of weed-killing solution to said applicator means.

5. In a dispensing device for applying a weed-killing liquid:
    (a) a handle means,
    (b) a reservoir means secured to said handle means and extending outwardly therefrom and normal thereto to constitute a laterally extending member, said reservoir means for containing the liquid weed-killing fluid, (c) an applicator means secured beneath said handle means and extending across said reservoir means and extending laterally so as to cover the lateral area between a row of plants, said applicator means receiving the weed-killing liquid from said reservoir means, and liquid barrier means on the underside of said reservoir means for preventing the flow of the weed-killing liquid across the bottom of said reservoir means.

6. In the dispensing device of claim 5, a bumper means extending at least partially about said reservoir means to fend off plants not intended to be killed.

References Cited by the Examiner
UNITED STATES PATENTS

| | | | |
|---|---|---|---|
| 2,261,411 | 11/41 | Rees | 15—569 |
| 2,281,367 | 4/42 | Moll | 15—579 |
| 2,659,918 | 11/53 | Stoner | 111—7.3 X |
| 2,821,048 | 1/58 | Efford et al. | 47—1 |
| 2,974,349 | 3/61 | Cassia | 15—579 X |

ABRAHAM G. STONE, *Primary Examiner.*
T. GRAHAM CRAVER, *Examiner.*